FIG. 1

| BUFFER ADD | BITS 0–7 | CURSOR BIT |
|---|---|---|
| 0 | S–M CODE | |
| 1 | M C 1 CODE (UNPROTECTED CHAR) | |
| 2 | CHARACTER DATA | |
| 3 | CHARACTER DATA | |
| 4 | CHARACTER DATA | |
| 5 | CHARACTER DATA | |
| 6 | S–M CODE | |
| 7 | M C 2 CODE (GRAPHIC) | |
| 8 | GRAPHIC DATA | |
| 9 | GRAPHIC DATA | |
| 10 | GRAPHIC DATA | |
| 11 | GRAPHIC DATA | |
| 12 | S–M CODE | |
| 13 | M C 3 CODE (PROTECTED CHAR) | |
| 14 | CHARACTER DATA | |
| 15 | CHARACTER DATA | |
| 16 | CHARACTER DATA | |
| 17 | CHARACTER DATA | |
| 18 | S–M CODE | |
| 19 | M C 1 CODE (UNPROTECTED CHAR) | |
| 20 | CHARACTER DATA | |

INVENTORS
TONY N. CRISCIMAGNA
THEODORE G. FLOROS

BY

ATTORNEY

Aug. 11, 1970 T. N. CRISCIMAGNA ET AL 3,524,181

DISPLAY SYSTEM

Filed June 13, 1966 9 Sheets-Sheet 2

Aug. 11, 1970 T. N. CRISCIMAGNA ET AL 3,524,181

DISPLAY SYSTEM

Filed June 13, 1966 9 Sheets-Sheet 3

DISPLAY SYSTEM

Filed June 13, 1966 9 Sheets-Sheet 4

DISPLAY SYSTEM

DISPLAY SYSTEM

Filed June 13, 1966 9 Sheets-Sheet 9

United States Patent Office 3,524,181

Patented Aug. 11, 1970

3,524,181

DISPLAY SYSTEM

Tony N. Criscimagna, Woodstock, and Theodore G. Floros, Poughkeepsie, N.Y., assignors to International Business Machines Corporation, Armonk, N.Y., a corporation of New York Filed June 13, 1966, Ser. No. 557,048

Int. Cl. G08b *11/00*

U.S. Cl. 340—324 6 Claims

ABSTRACT OF THE DISCLOSURE

A keyboard-CRT display system for operation under the control of a data processor has circuits for receiving and decoding commands for inserting and utilizing a cursor which operates as a tag associated with data in the display buffer. Operation of a jump key detects and removes the cursor code from the buffer address in which it resides and inserts it in the next appropriate data field. Regeneration of the display image continues and the buffer is cyclicly read during search for an unprotected field. A code inserted by the processor at the beginning of each new field identifies the nature of the field. If the field is not appropriate for insertion of the cursor code, the search for an appropriate field is continued. A continuous jump key provides multiple jumps until it is released. When the display is used in conversational mode, the processor inserts the cursor at an address in the buffer corresponding to the start of the data field reserved for an answer from the operator. The operator enters the data requested starting with the cursor location. The cursor is advanced by and during the entry of the answer, so that the initial and final positions of the cursor establish the boundaries of the answer, which boundaries can then be utilized for non-destructive reading only the pertinent data from the buffer.

Figures 2, 2A:
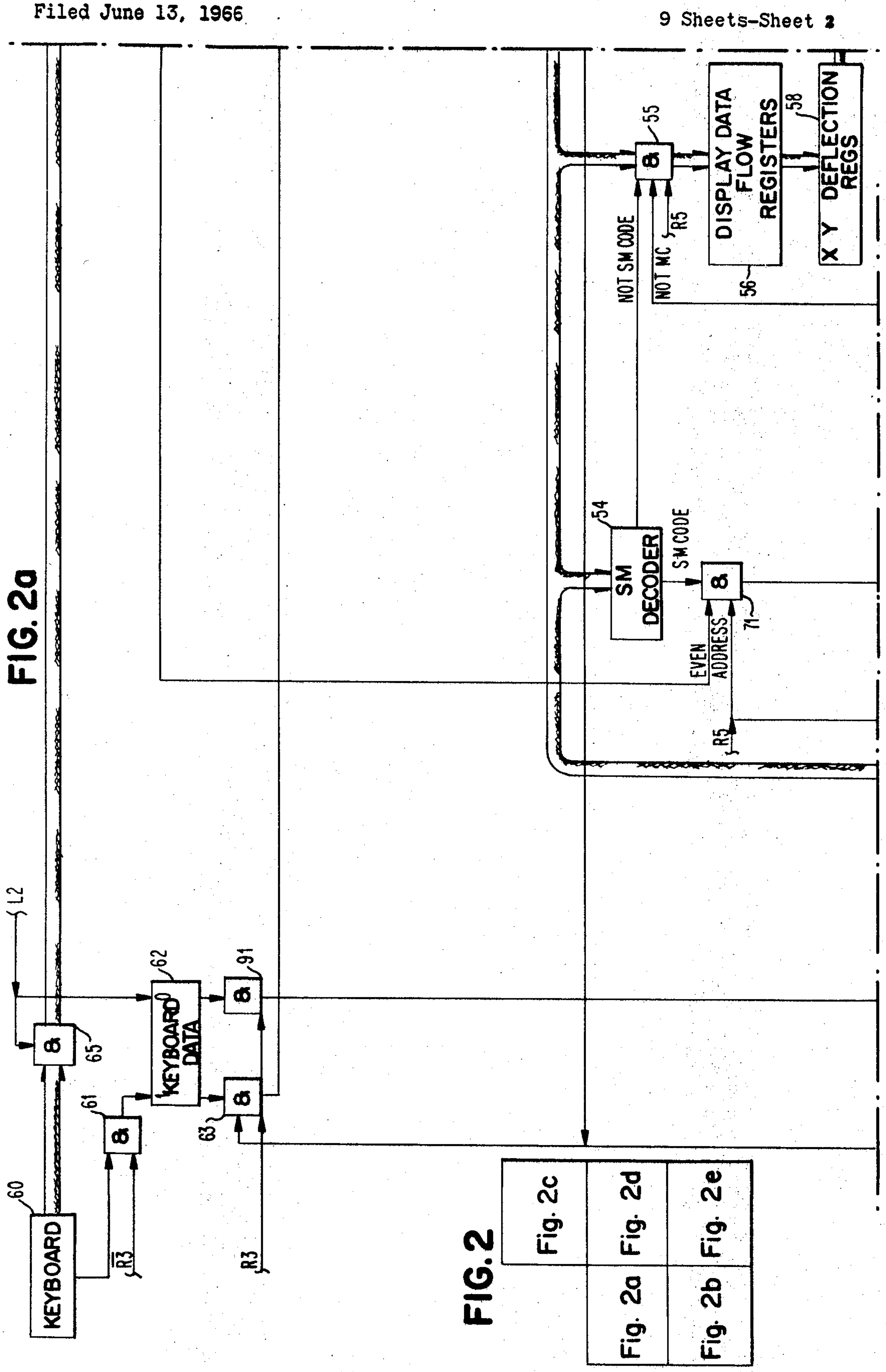
Figure 2B:
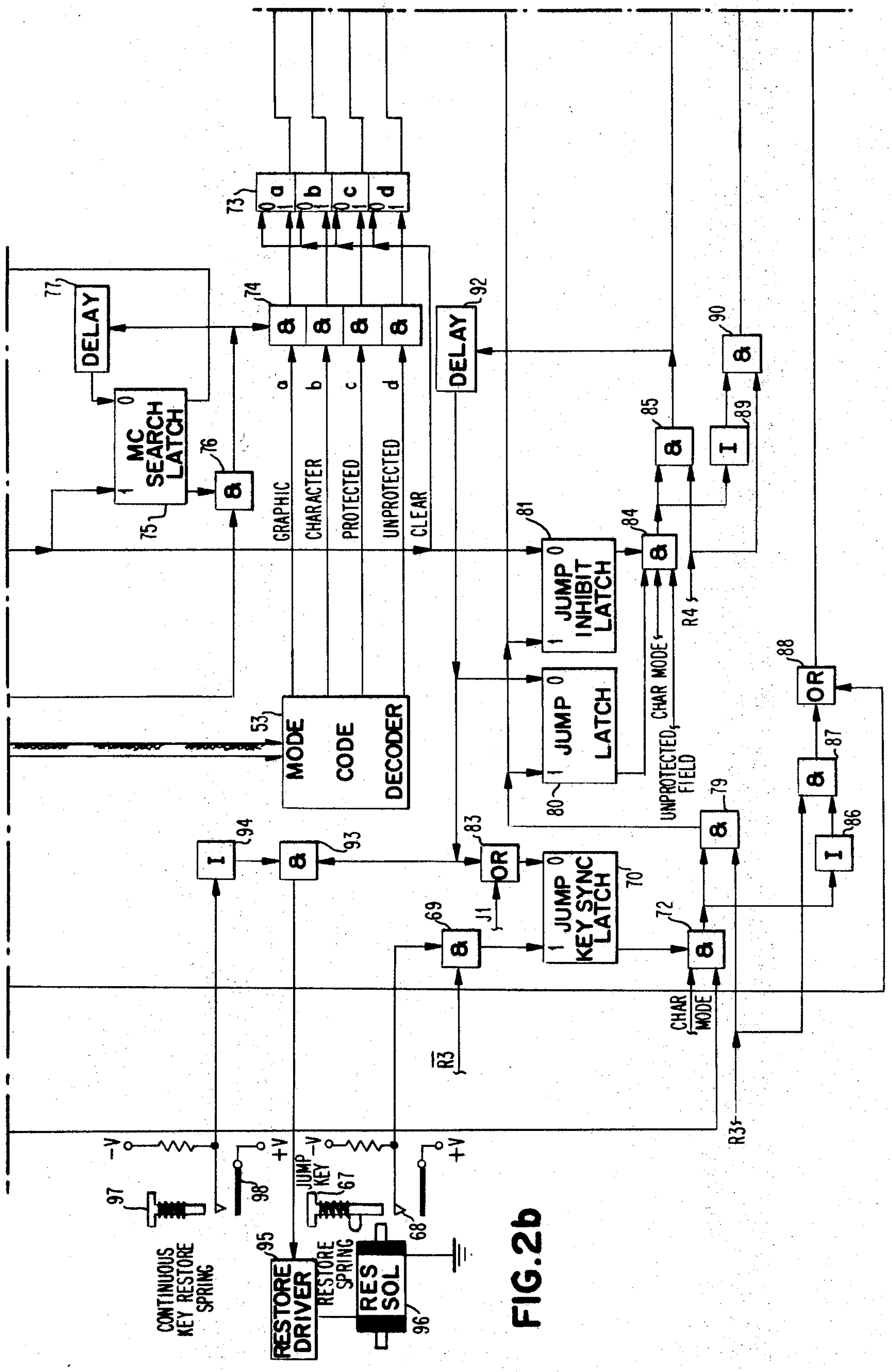
Figure 2C:
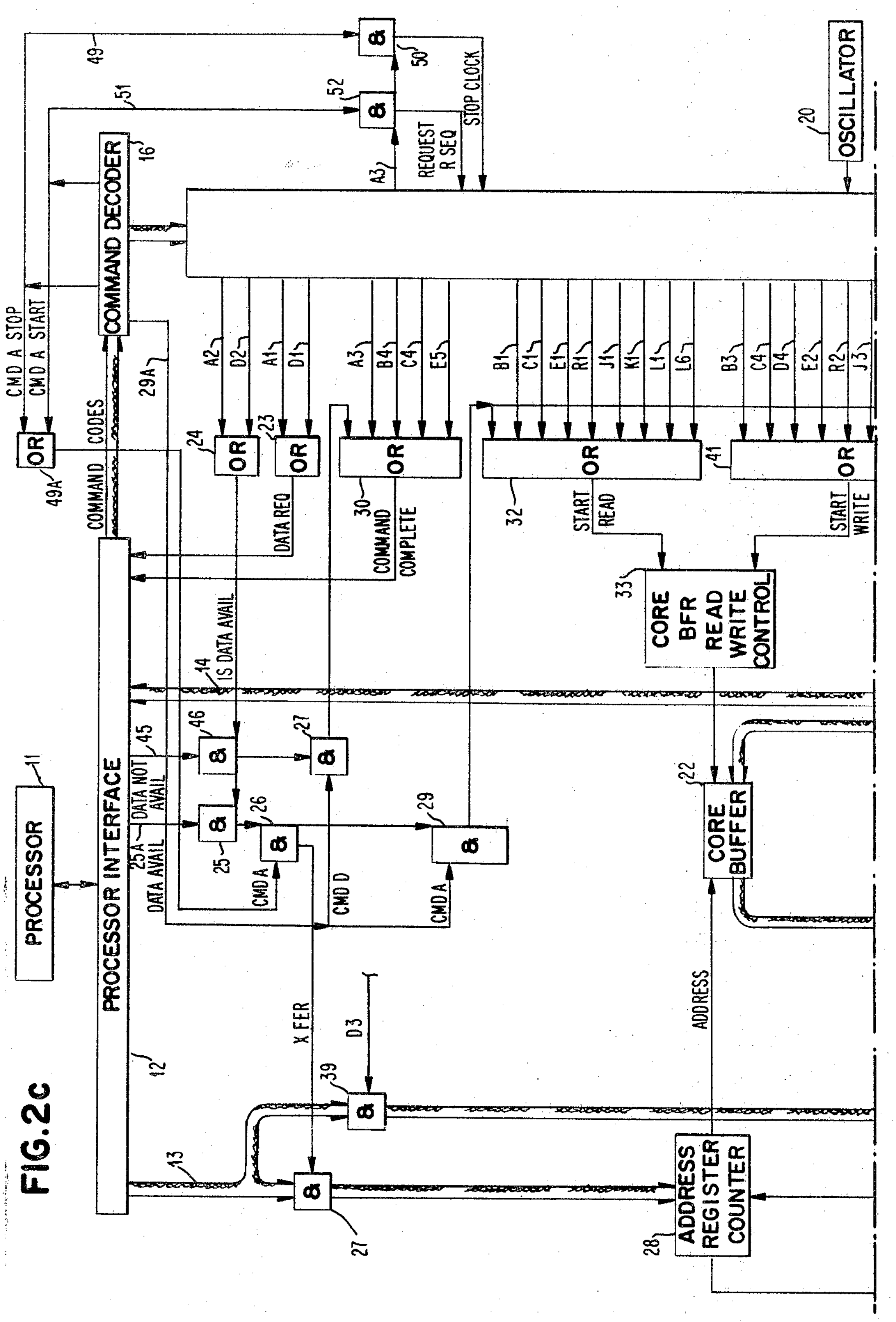
Figure 2D:
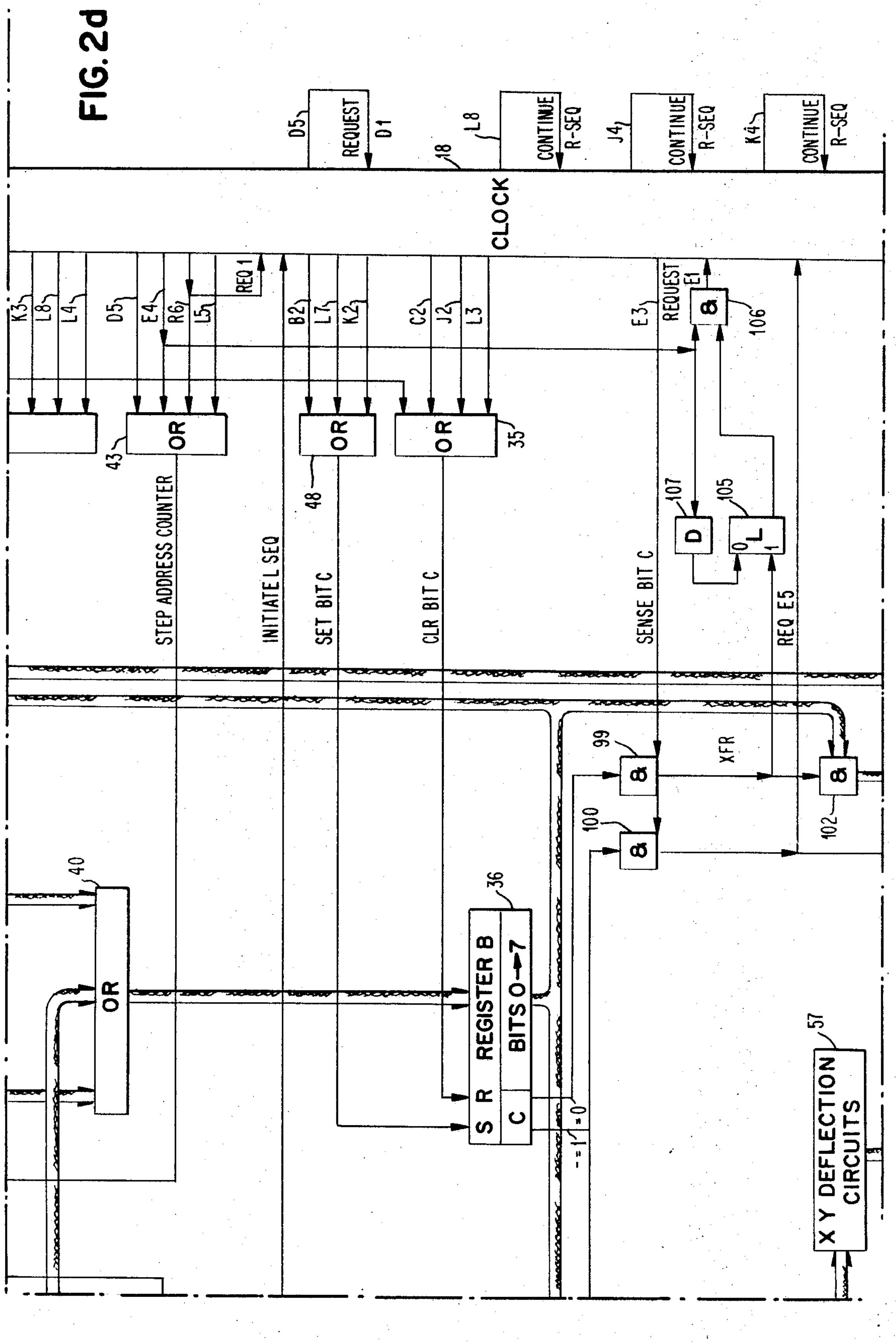
Figure 2E:
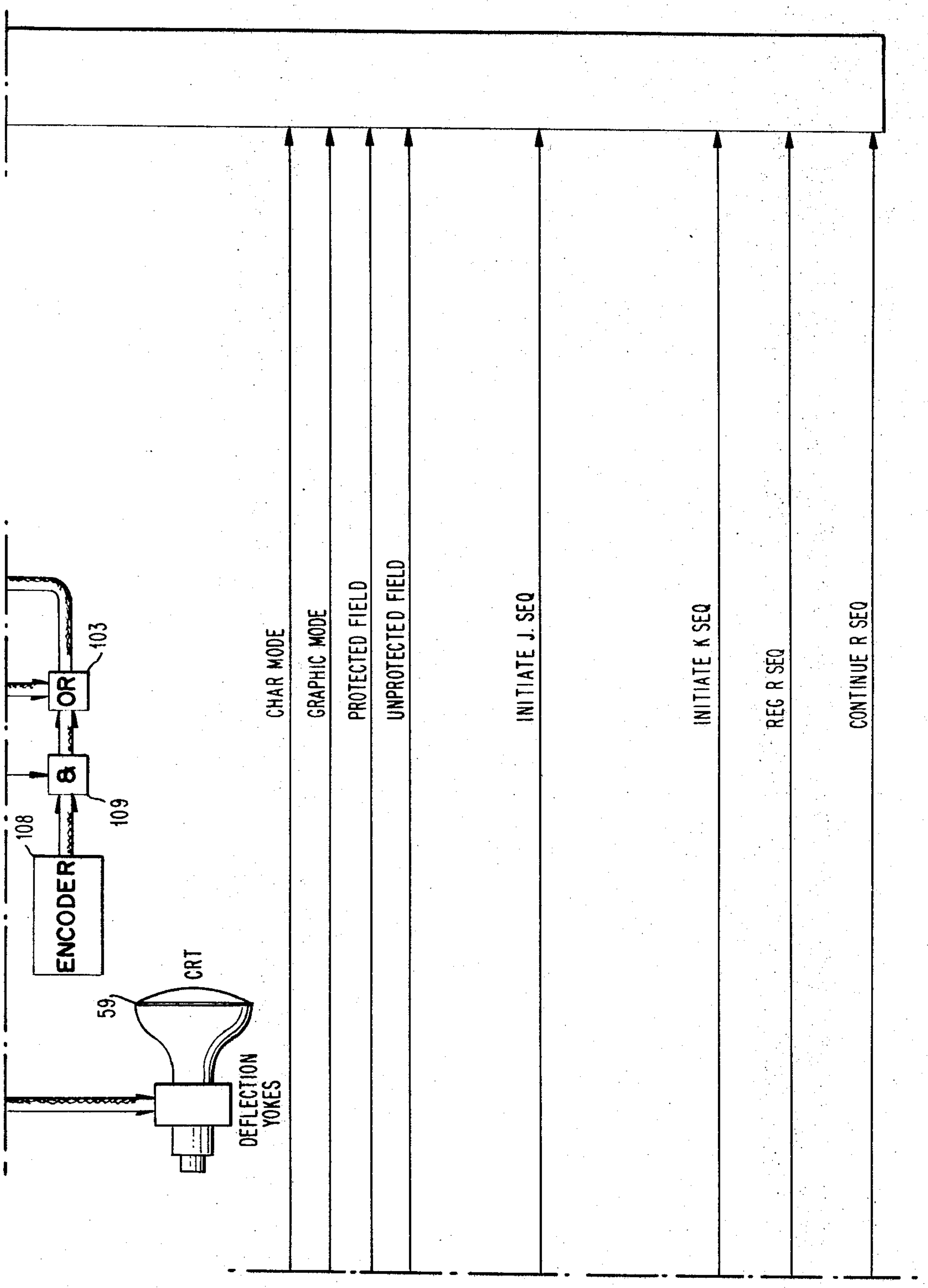

This invention relates to data display devices and more particularly to data display devices suitable for simultaneously displaying alphanumeric and graphic data.

It has long been recognized that alphanumeric and graphic displays enhance communications between an operator and a computer and facilitate entering and withdrawal of information therefrom. This improvement results from a number of factors. One of the most important being the ability to arrange the data to be displayed in a format which is more meaningful to the operator. With the improved format, the operator is in a better position to interpret the data and call for new data, clarification or alteration if needed. The improved format for displaying and entering data diminishes operator skill requirements and permits a relatively unskilled operator to converse freely with the computer thus reducing the time required to extract the desired data.

Systems employing display terminals of this nature have found widespread use in rail and airlines reservation systems. In such systems, it is possible for a relatively untrained reservations clerk to communicate with a data processing system to determine availablity of space and reserve same both rapidly and accurately.

In such uses, it is desirable to let the operator know where entries of data will be made. For this purpose, a special indicia called a cursor is provided. The indicia may take many forms but may be a bright line on the face of the display tube above which a data entry will be made. As soon as an entry is made, the cursor advances to the next entry location. For editing purposes, the operator can control movement of the cursor and may advance or backspace it. Such a system is disclosed by Rutland et al. in U.S. Pat. No. 3,166,636 issued Jan. 19, 1965.

Operator controlled movement of the cursor one character position at a time, while useful for editing purposes is slow, and in addition, limits the use to which the display may be put. If both graphic and alphanumeric data are to be displayed it is necessary to provide means for moving the cursor past graphic fields of data. Furthermore, it is desirable that the operator be able to move the cursor from one character field to another character field without going through each entry position which intervenes.

In reservation system and other similar systems the display may be utilized in a question and answer manner. In this mode a remote operator via a central processor, under program control, causes a question to be displayed on the display screen. The local display operator is then required to transmit an answer to the question. The answer will, if a cursor symbol is provided, start at the cursor position and continue from that point.

Such an arrangement is restrictive in nature since it requires that definite areas be set aside for questions and answers and furthermore that all answers start at the same fixed point. It permits the operator freedom of movement, in that he is allowed to position the cursor via a keyboard, however, it fails to provide him with a defined starting place. The ability to pin point the area for the operator reduces the decision making requirements of the operator and lends itself to a more efficient utilization of the display capabilities. With this capability the areas for questions and answers can be expanded or contracted as the situation requires and the operator decision making requirements are reduced. In addition to the above advantage, specific data is readily retrieved without the necessity of reading the entire display storage. Since the processor specifies the starting position of the answer it need only read the display memory from the specified location until it encounters the cursor which marks the end of the answer or message.

One object of this invention is to provide a data display with a cursor symbol for indicating the data entry position and in which the cursor symbol may be moved under operator control from anywhere in one character field.

Another object of the invention is to provide a display as set forth above in which the cursor bypasses graphic data fields positioned between alphanumeric data fields.

A further object of the invention is to provide a unique order coding and means responsive thereto for improving the speed and accuracy of a combined graphic and alphanumeric data display device.

Yet another object of the invention is to provide a display system in which a cursor symbol or mark is provided and which mark is under the control of a central processor.

The invention contemplates a data display system which accepts fields of coded data representing graphic and alphanumeric images and provides visual representations thereof and accepts coded data representing a cursor for providing a visual indication of the physical location at which data may be entered and which includes, first manually operative means for detecting coded data representing the cursor and for removing said data from the source, second means responsive to said data for detecting transitions of data from one field to another and for identifying character data fields, and third means responsive to said first and second means for inserting coded data corresponding to the cursor into the source of data when said first and second means are simultaneously active whereby the cursor and the corresponding physical location at which data may be entered are jumped from one character field to another.

The invention also contemplates a display system provided with a storage device and a display responsive thereto for creating visual images corresponding to the stored data comprising means responsive to a first signal condition for inserting coded data representing variable information in selected storage locations.

The foregoing and other objects, features and advantages of the invention will be apparent from the following more particular description of a preferred embodiment of the invention as illustrated in the accompanying drawings.

Figures 3, 3C:
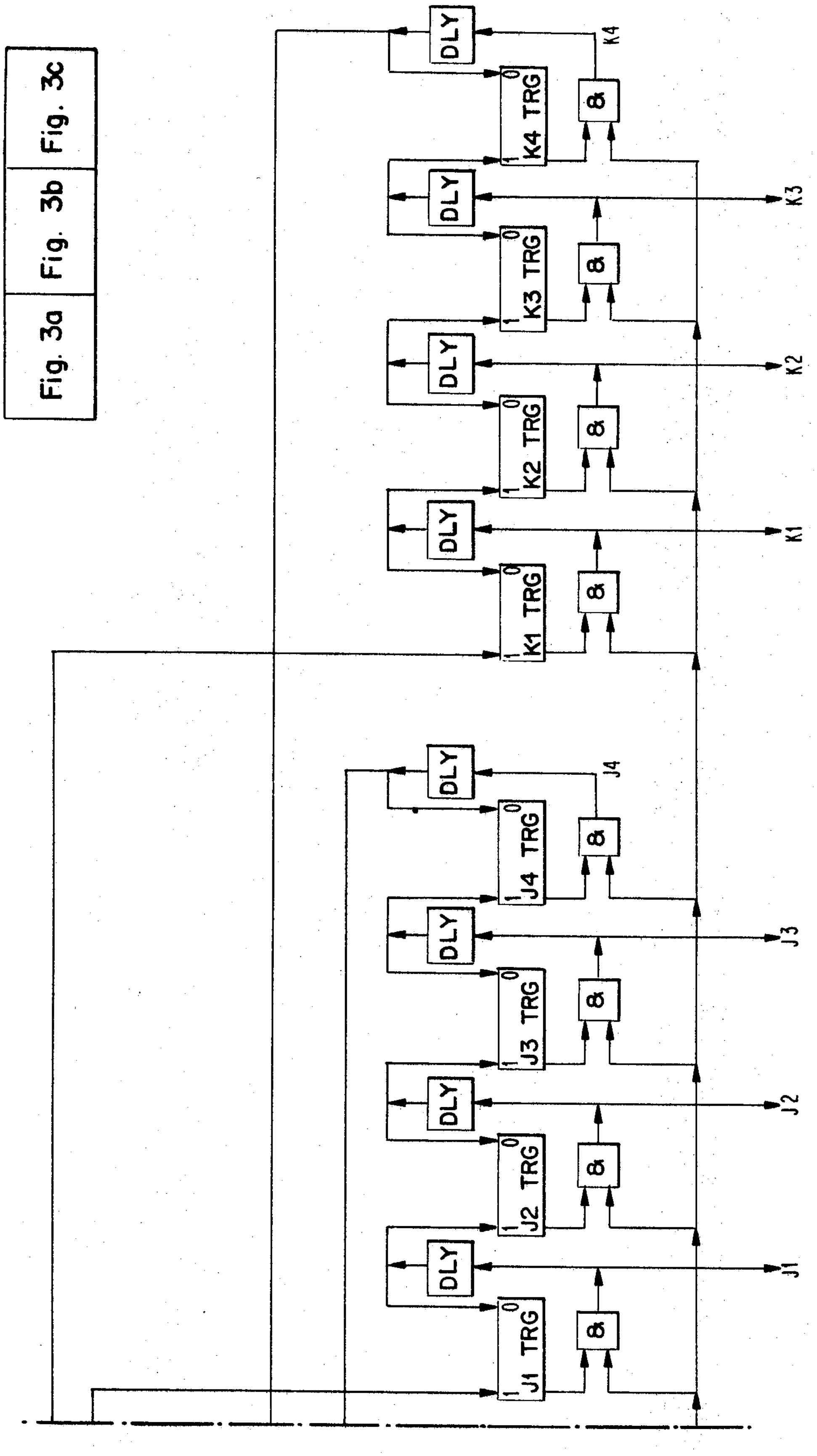
Figure 3A:
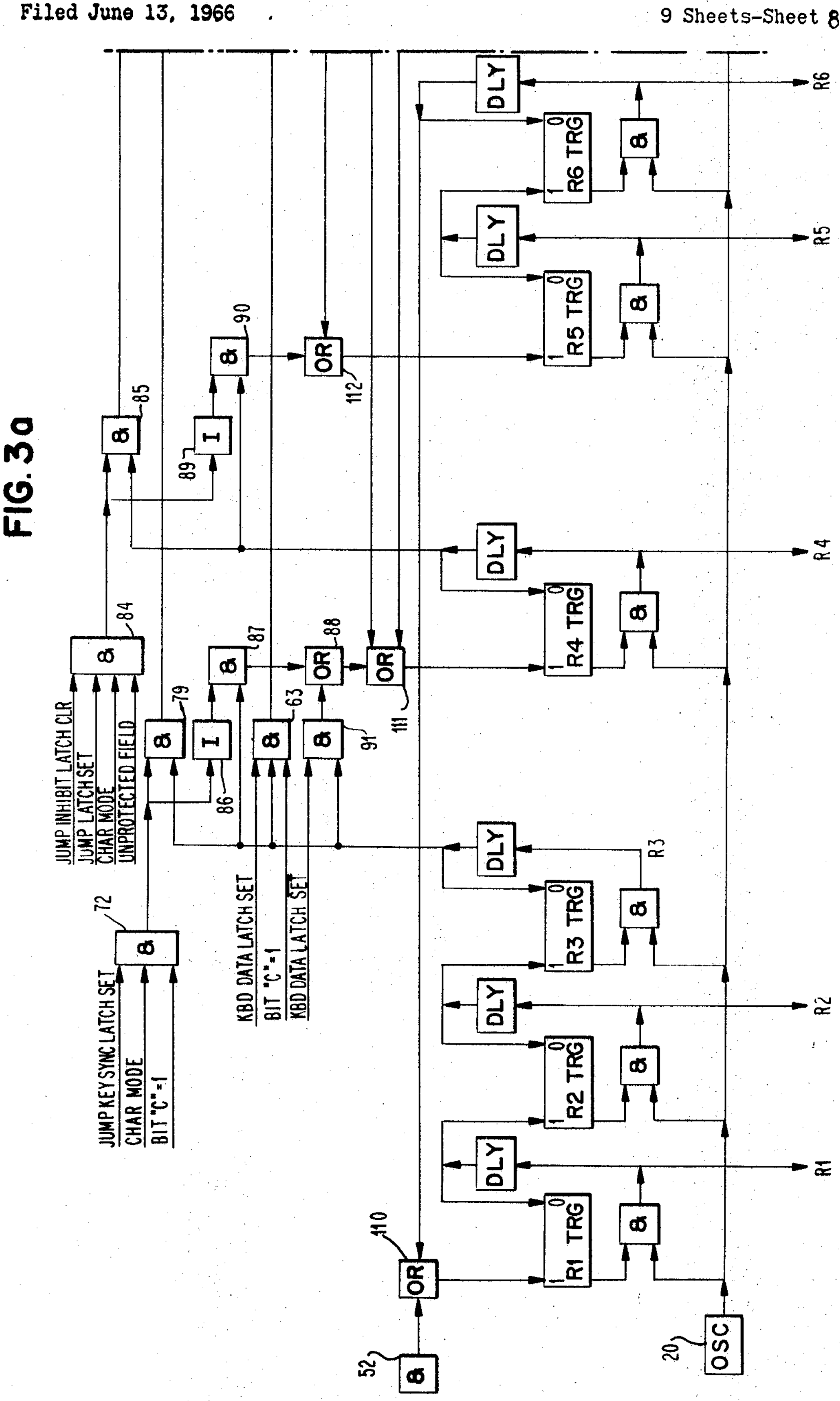
Figure 3B:
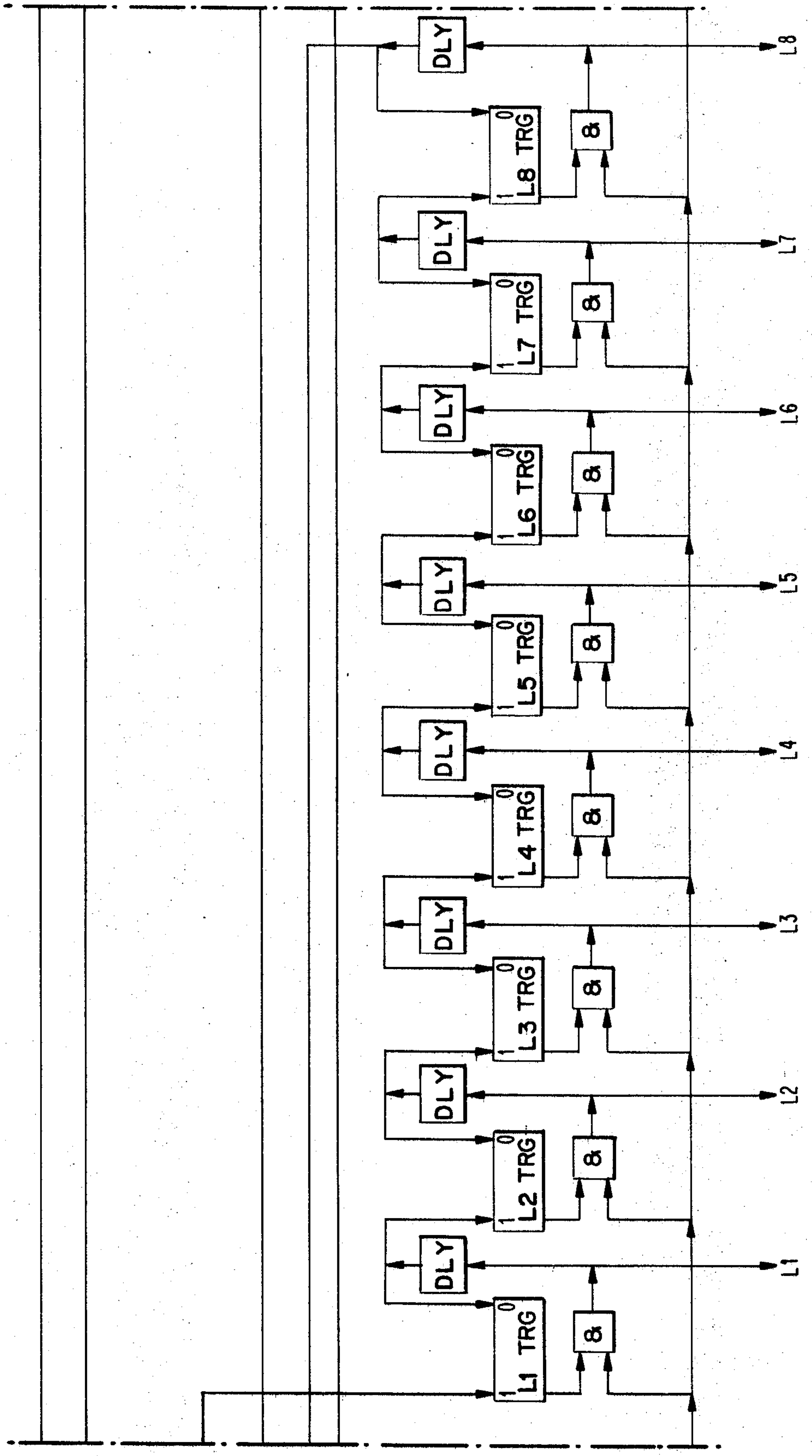

In the drawings:

FIG. 1 is a representation in tabular form of graphic and alphanumeric data;

FIGS. 2*a*–2*e*, when arranged as shown in FIG. 2 are block diagrams of a display system employing the invention; and FIGS. 3*a*–3*e*, when arranged as shown in FIG. 3 are block diagrams of a portion of the clock illustrated in FIGS. 2*a*–2*e*.

Display devices of the type involved here are generally provided with a local storage device which stores digital data defining the image to be reproduced. When so provided, the memory or storage device is cycled at a rate sufficient to regenerate the image to avoid flicker and fading. The local storage device is not essential to operation since the computer can supply data on a cyclic basis for regenerating the image. Systems employing local storage are advantageous since they free the computer once the image is loaded into the local storage device.

The present invention is described in conjunction with such a display, however, the invention will work in the same manner with an unbuffered display since the attached computer provides the buffer function and is fully analogous in operation to the local buffer in a unit so provided.

The display unit is required to handle two basic types of information for display purposes. Graphic data is defined by specifying the rectangular coordinates in binary coded form of the end point of each straight line. Alphanumeric data is defined by a unique binary code. Alphanumeric data may be defined in the same format as graphic data, however, such a scheme is wasteful of both storage and time.

The buffer is divided into fields, each of which can only store one type of data since a coded field designation preceding the data establishes control functions which govern the manner in which the data is handled to produce the display. More than one field may and usually will be provided since such an arrangement can result in advantages not otherwise obtained. For example, each line of alphanumeric data may comprise a field of data and, with the unique cursor jump provided by the invention, moderately rapid editing of large alphanumeric displays is possible. How this advantage is attained will become more apparent as the description continues.

FIG. 1 illustrates the *n* local buffer address and the data stored therein. Each line comprises a word of storage and contains nine bits. In graphic fields, four such words are required to define single end point. In an alphanumeric field, a single word defines one character. The beginning of each field whether graphic or alphanumeric is provided with a unique code "SM." In order to increase the capability with a nine bit buffer, this code is only unique at an even address and if found at an odd address does not define the beginning of a new field. The unique SM code, i.e. SM coupled with an even address, is followed by one of a pulrality of mode codes $MC_1$–$MC_n$. These unique codes specify the nature of the data which follows. $MC_1$ specifies an unprotected character field while $MC_2$ specifies a graphic field. The $MC_3$ code specifies a protected character field in which editing by an operator via the keyboard associated with the display is prohibited. This particular field is utilized to present format data or data which the operator requires and therefore, the ability to alter the data is denied the operator.

The use of the SM/MC coding described above for defining the beginning of fields or transitions from one fiield to another is a particularly useful tool since it simplifies the operation of the device and reduces the local buffer requirements thus permitting larger data storage or smaller buffers for a fixed amount of data. Other MC mode codes are available, however, since these are not applicable to the subject invention a further description at this time could only serve to obscure the invention. In fact, an effort has been made to delete those portions of the structure which are not functionally related to the subject matter of this invention in order to more clearly pinpoint the exact nature and scope of the invention.

The buffer and its contents are symbolically illustrated in FIG. 1. The buffer is provided with *n* addressable words. The SM code designating the beginning of different fields is located at even address 0, 6, 12 and 18, thus, the arbitrarily selected buffer load contains four fields.

The first field of data is identified by the $MC_1$ code in buffer address 1 and specifies unprotected character data. The coded data in addresses 2–5, inclusive, defines four characters.

The second field is identified by the $MC_2$ code in buffer address 7 and specifies graphic data which is set forth in addresses 8–11 inclusive. Since four words are required to specify a coordinate, this field will cause beam movement (either blanked or unblanked depending on the data) to the coordinate specified by the data in addresses 8–11 from its previously attained position.

The third field is identified by the $MC_3$ code in buffer address 13 and specifies protected character data which follows in addresses 14–17, inclusive. A protected character data field is substantially identical to an unprotected field, however, in a protected field the operator is denied the ability to edit and cursor operation is not permitted under operator control.

The last field is identified by the $MC_1$ code in buffer address 19 and specifies unprotected character data. This field is, except for data content, identical with the first field described above.

The buffer is nine bits wide. Bits 0–7 inclusive, define either character or graphic data, as previously set forth, and bit 8 is the cursor bit. Only one word in the entire buffer will be provided with a cursor designation code. All other word locations will designate no cursor. How the cursor bit code is mainpulated will become apparent as the description continues. At this point, however, it should be noted that the cursor code can only be manipulated by the operator via his keyboard in an unprotected characteh field. He can move the cursor forward or backward within the field one position at a time, as taught in the prior art, or he can move it from field to field according to the invention.

In FIG. 2, a processor 11 supplies commands and graphic data. The processor is connected to an interface unit 12 which is provided with a bus out 13 and a bus in 14. The busses 13 and 14 are for handling the data which is going into and out of the display unit respectively. The interface, in addition, provides a communication path for the commands to a command decoder 16. The command decoder 16 decodes the commands received from the processor and supplies the result over a plurality of lines to a clock 18 which controls the timing and operation of the display. An oscillator 20 connected to clock 18 provides the pulses which are distributed under control of clock 18.

Command decoder 16 decodes the five commands supplied by the processor. The first command is a set buffer address register command. This command is utilized to insert or extract data from the memory associated with the display and how it is employed will appear from the description later. The second command is an insert cursor command and inserts a uniquely coded bit in one of the addresses in the local memory. The third command is a "remove cursor" command which removes the uniquely coded cursor bit from the address in memory in which it resides. The fourth command is a "write buffer" command and is utilized when data from the processor is to be inserted in the local memory. The fifth command is the "read cursor" command. This particular command causes reading of the data in the local storage up to the present location of the uniquely coded cursor bit in the memory.

The first command (set buffer address register) is dual in nature and provides timing pulses A1 through A3, the second command (insert cursor) provides timing pulses B1 through B4, the "remove cursor" command, the third command, provides timing pulses C1 through C4, the fourth command (write buffer) provides timing pulses D1 through D5. Timing pulses D1–D5 are repeated until terminated by a subsequent command. The fifth command (read cursor) provides timing pulses E1 through E4 which are repeated until a detected condition occurs whereupon an E5 pulse is provided to terminate the sequence. The clock, in addition, provides timing pulse sequences R, J, K and L. These sequences while not the result of specific commands are commenced at various times during the execution of one or more of the above five commands. The R sequence employs pulses R1 through R6 which are repeated until terminated by a subsequent command and are utilized to cause the data in the local storage to be sequentially applied to the display for regenerating the image on the display. The J sequence is utilized when the operator wishes to move the cursor, by a jump procedure which will be explained in detail, from one character field to a subsequent field. During the J sequence, the cursor is removed from the field in which it resides and the K sequence is then utilized to complete the function by inserting the cursor in the next appropriate field. The L sequence comprising pulses L1 through L8 is utilized when data is to be entered into the buffer by the keyboard and causes the cursor to advance by one position while the data in the address previously occupied by the cursor is replaced by the keyboard data inserted by the keyboard operator.

When the processor places data in the buffer 22, it must previously specify the address at which the data will be inserted. This is accomplished by the "set buffer address register" command. The command is transmitted from the processor to the interface and decoded in decoder 16. The decoded command causes the sequence A1 through A3 to start. In addition an output is provided on a line 49 which indicates the nature of this dual command. Upon the occurrence of the A1 output, a request is sent via OR circuit 23 to the interface. This prepares the interface to supply the address. The A2 pulse is applied via OR circuit 24 to an AND circuit 25 which is conditioned by a line 25A from interface 12 if data is available. An AND circuit 26 which has previously been conditioned by the output on line 49 via an OR gate 49A transfers the data on the bus out 13 via an AND circuit 27 to an address register counter 28. The data sets the address register counter at the address in which the subsequent data transmitted by the processor is to recorded.

This command is terminated by the A3 pulse which is applied to an OR circuit 30 and transmitted to the interface to indicate that the set buffer address register command has been completed. As soon as the command complete signal has been received, the processor responds with the write buffer command if, at this time, data is to be inserted in the core buffer 22 for use in the display.

The write buffer command when received by the interface is transmitted to the decoder 16 which decodes the unique command defining the write buffer command and causes the clock to start the D1 through D5 sequence. Upon the occurrence of timing pulse D1, the data which is to be inserted in the core buffer is requested via OR circuit 23. Timing pulse D2 is applied via OR circuit 24 to AND circuit 25. If data is available the output of AND circuit 25 is applied through an AND circuit 29 which has previously been conditioned by a signal on a line 29a from the command decoder 16 for indicating that the write buffer command has been decoded. The output of AND circuit 29 is applied via an OR circuit 32 to a core buffer read/write control circuit 33 to cause the buffer to be read at the address previously inserted in the address register 28 by the prior command. The output of AND circuit 29 is also applied via an OR circuit 35 to clear the cursor code position of the output register 36 of the core buffer 22. Timing pulse D3 is applied to an AND circuit 39 and gates the data on the output bus 13 via an OR circuit 40 to the data positions of the output register 36.

At this point, the data which the processor wishes to write into core buffer 22 is contained in the output register 36 and upon the occurrence of the timing pulse D4 which is applied to an OR circuit 41, the core buffer read/write control circuit 33 is caused to write the data contained in register 36 into the core buffer 22 at the address contained in the address register counter 28. Again, this address was the address previously inserted by the prior set buffer register command. At the conclusion of timing pulse D4, timing pulse D5 occurs and is applied via an OR circuit 43 to the address register counter 28 and causes the address register counter to increment by one position so that the next word position in core buffer 22 will be addressed the next time data is to be entered. At the same time, D5 institutes a repetition after a delay of the sequence D1 through 5. Thus, until a new command is received, the data from the processor will be transmitted over the interface as described above and inserted in successive addresses in the buffer storage 22. Upon the insertion of a word in the buffer at the conclusion of the D4 count, D5 will step the address register to the next position so that the next word coming over the interface from the processor will be inserted in the next address. If the capacity of the counter is exceeded a wraparound in the buffer will occur and new data will be stored starting at the first address of the core buffer.

If data is not available a line 45 from the interface will condition an AND circuit 46 which upon the occurrence of D2 will signal a command complete. The D2 pulse from AND gate 46 is passed through an AND circuit 47, which is conditioned by the line 29a from command decoder 16, and through OR circuit 30 to indicate that the command is complete. At this time the display unit will await the next command from the processor since a command complete from OR circuit 30 terminates clock operation on the D subsequence just described and D5 will not occur to institute another cycle of D pulses.

Assuming for the moment that the data written in the buffer constitutes a question which the processor is asking the operator to answer, the next command which the processor would send, would be the insert cursor command since the insert cursor command would cause a unique cursor code to be positioned at a particular buffer address, thus indicating to the operator where the answer required is to start. However, the insert cursor command code must be preceded by a set buffer address register command, which was previously described, in order to indicate the exact location on the display which will be a function of the position in storage where the code will be inserted. The insert cursor command comes over the interface and is decoded in command decoder 16 and institutes the B1 through B4 sequence.

Timing pulse B1 is applied to OR circuit 32 and to core buffer read/write control 33 and causes the address previously inserted by the set buffer address register command to be read into the output register 36 via OR circuit 40. Timing pulse B2 is applied to an OR circuit 48 and the output of OR circuit 48 is applied to set bit C of register 36 to a one to indicate the unique cursor code. Timing pulse B3 is applied to the core buffer read/write control circuit 33 via OR gate 41 and causes the contents of the output register 36 to be written back into the code buffer 22. Timing pulse B4 is applied to OR circuit 30 which supplies the command complete output to indicate that the insert cursor command has been completed.

At this point in the normal course of operation, the processor via its program will cause regeneration of the display so that operator can see the question and supply an answer starting at the location indicated by the cursor position. In order to effect regeneration, the program and the processor will specify an address by the set buffer address register command and cause regeneration by the sequence R1 through R6, the address at which regeneration is to commence is specified by the set buffer command followed by the sequence R1 through R6.

As previously stated, the set buffer address register command is dual in nature. The two commands are basically the same and insofar as the clock is concerned, result in the timing pulses A1 through A3. The first of the pair of commands previously described sets the buffer address register and stops clock operation. Output line 49 from decoder 16 is ANDED in a gate 50 with the A3 pulse and stops the clock 18 at this time. The A3 pulse transmitted via OR gate 30 signals completion of the command. The second of the pair of commands sets the buffer address register and institutes the R timing pulse sequence. An output from the decoder 16 on a line 51 is ANDED in a circuit 52 with the A3 pulse and the output of AND circuit 52 is applied to the clock for requesting the R1 through R6 sequence.

The R1 timing pulse from the clock 18 is applied through gate 32 to the read/write control circuit 33 for reading the address previously inserted in the address register 28 by the set buffer address register command. The subsequent R2 pulse is applied through OR circuit 41 and causes the data in register 36 to be read back into the core memory 22 at the address specified by register 28. Timing pulse R3 and R4 perform functions which will be described later on in the course of the description. These functions are concerned with the keyboard operation, that is either entry of data via the keyboard or keyboard controlled movement of the cursor code in the memory.

The contents of register 36 are applied to a mode code decoder circuit 53 where the bit positions 0 through 7 are examined to determine the mode code. In addition, the contents are applied to an SM decoder 54 to determine if the contents comprise an SM code. If the contents are neither SM code or a mode code, an AND circuit 55 is enabled at R5 and the contents of the register 36 are applied to a data flow registers 56 which is connected to the X, Y deflection circuits of the display 57 via XY deflection register 58. The deflection circuits 57 are connected to the yokes of the CRT 59 and control the beam movement in accordance with the contents of register 58.

The R6 pulse is applied through OR circuit 43 to step the address register counter 28 and cause the counter to address the next sequential address. R6, in addition, is applied to the clock 18 and causes another R cycle to be instituted. Thus, the R cycle is repeated continuously and the data in the core memory 22 is transferred via OR circuit 40 through register 36 and gate 55 to display flow registers 56, to XY deflection registers 58, to XY deflection circuits 57 and thence to the display unit 59. This process is cycled continuously and the address register 28 wraps around, causing the first address in the buffer to be read and this is then followed by the subsequent addresses continuously. In this way the display is regenerated on the CRT 59.

During the course of regeneration, the operator may edit or compose data by a keyboard 60. Keyboard entries must be indicated prior to the occurrence of the R3 pulse. For this purpose, the R3 pulse inverter labeled ($\overline{R3}$) is applied to an AND circuit 61 to condition the AND circuit 61 whereby a keyboard data latch 62 is set when data is to be entered by the keyboard. The keyboard data latch 62 conditions an AND circuit 63 which is also conditioned by the presence of a cursor code in the cursor position of the data register 36. When the AND circuit 63 is properly conditioned, that is, by the setting of the keyboard data latch 62 and the presence of the cursor code in the register 36, the R3 pulse provides an output from AND circuit 63 which causes the L sequence to be initiated by the clock 18.

Timing pulse L1, is applied to OR circuit 32 and to core buffer read/write control circuit 33 and initiates a reading operation at the address specified by the address register 28. Timing pulse L2 is applied to an AND circuit 65 and gates the data inserted at the keyboard 60 into the output register 36. The prior reading cycle initiated by timing pulse L1 was to clear the address. The contents of the register 36 are modified at this time to reflect the data which the operator wishes to insert in that position. Timing pulse L3 is applied to OR circuit 35 to clear the cursor bit position of register 36. Timing pulse L4 is applied through OR circuit 41 to core buffer read/write control circuit 33 and inserts the data residing in output register 36 in the addressed storage location of the core buffer 22. Thus far, the new data presented by the keyboard has been substituted for the old data if there was any present in the current address which contained the cursor. The cursor was removed by the L3 pulse and must now be inserted in the next subsequent address.

Timing pulse L5 is applied to OR circuit 43 and steps the address register 28. Timing pulse L6 causes a read cycle and is applied to OR circuit 32 and core buffer read/write control 33 which causes the next address in memory to be read into the output register 36. Timing pulse L7 is applied via OR circuit 48 to set the cursor bit in the cursor position to indicate a cursor. Timing pulse L8 is applied to OR circuit 41 and initiates a write cycle whereby the data in register 36 which now includes the cursor code is inserted back in the core buffer 22. Timing pulse L8 is in addition applied to the clock and requests a continuation of the R sequence which was previously interrupted at R3. Thereafter, timing pulses R4, R5 and R6 are supplied and operation is as previously described.

The data stored in buffer 22 is basically one of two categories. The first category is image data. The data in this category is subdivided into three-subcategories. The first sub-category is graphic data which when supplied to the CRT via the circuits previously described produces points or lines which, when connected or unconnected, provide a graphic representation. The second sub-category is alphanumeric information which is unprotected and permits the operator to edit or compose within the areas containing unprotected character data. The third sub-category is protected alphanumeric character data which the operator cannot edit. The second major category of data is control data. Here again, the control data is divided into a number of categories. The first category is the SM data which defines the beginning of any data field. The SM, as previously described, is a unique code which is only unique in an even address and thus defines the beginning of a new field of data as set forth above.

This code is always immediately followed by a mode code which defines the nature of the data which follows. There are three mode codes—graphic, alphanumeric or character protected and alphanumeric or character unprotected. As previously set forth, an SM decoder 54 decodes the SM code and a mode code decoder 53 detects the mode code. The mode code is detected as either graphic, character protected or character unprotected. An output line labeled "character" from mode code decoder 53 is up when either the protected or unprotected lines are up. However, the protected and unprotected lines cannot be up simultaneously because the data which follows the MC code will either be protected or unprotected but not both. When the data is graphic data, only the graphic line will be up.

The AND gate 55 is connected to an output of decoder 54 which indicates that the data applied to the decoder is not an SM code and in addition, to an output derived from the mode code decoder 53 via a path which will be described later which indicates that the data from the register is not a mode code. Thus, gate 55 will only transmit data from the output register to the display flow register 56 when the R5 pulse previously described occurs and the data from the output register is not control data, that is, either not the SM code nor one of the three possible mode codes.

While editing or composing data, the cursor is moved one position at a time, thus successive characters may be edited or entered by the operator at the keyboard. The keyboard is, however, provided with a jump key 67 which the operator may depress when he wishes to move the cursor more than one character position. When the jump key is depressed, the cursor will be removed from the location in which it resides and inserted in the first data location following the next unprotected character mode code. The portions of the circuit which perform this function will now be described.

When the operator wishes to jump the cursor from one data field to another he depresses the jump key 67 which closes contacts 68 thus applying a positive voltage to an AND circuit 69 which is conditioned at all times but R3. The output of AND gate 69 sets a jump key sync latch 70 which has its output connected to one input of an AND circuit 72 thus conditioning one of the three inputs of the AND circuit. The second input of AND circuit 72 is conditioned by the character mode code signal which has previously been detected. The character mode code signal is derived from the mode code decoder 53. The four outputs, graphic, protected character and unprotected character from the mode code decoder 53 are applied to AND circuits 74 (*a*, *b*, *c* and *d*) which have been previously conditioned. The conditioning of AND circuit 74 is under control of the SM decoder 54. The output of the SM decoder 54 is applied to an AND circuit 71 which is conditioned by an even address from address register 28 and by the R5 pulse. The output of AND circuit 71 is connected to the 1 or set input of the mode code search latch 75. The one output of the latch 75 conditions an AND gate 76 which is triggered at the R5 timing pulse to condition AND gates 74 (*a*, *b*, *c* and *d*) during the R5 timing pulse. The outputs of AND gates 74 (*a*, *b*, *c* and *d*) are connected to mode latches 73 (*a*, *b*, *c* and *d*), respectively. Each of the AND gates sets a corresponding latch and the latch set indicates which mode is specified by the code in the register 36. The mode code search latch 75 is reset upon the occurrence of an output at AND gate 76 via a delay circuit 77 which provides for the almost immediate resetting of this latch to enable it to detect the next SM code if the sequence is repeated.

The mode code latches 73 (*a*, *b*, *c* and *d*) are all reset upon the occurrence of an output at AND gate 71. The resetting occurs just prior to a search so that the latches are all reset, and if the mode has changed, the mode latches will be reset and ready to accept the new mode. The third input to AND circuit 72 is derived from the cursor position of the data in register 36. Thus, with a cursor code, and a character mode, and with the jump key depressed, AND circuit 72 develops an output which is applied to one input of an AND circuit 79. The other input of AND circuit 79 is the R3 timing pulse. The output of AND circuit 79 sets a jump latch 80 and a jump inhibit latch 81 and initiates a J timing sequence.

The J1 timing pulse is applied through OR circuit 32 to cause the data contained in the address specified by the address register 28 to be inserted in the output register 36 which is the same data which was in there before. The J2 pulse is applied via OR gate 35 to clear the cursor bit from register 36 and the J3 pulse is applied via OR gate 41 to reinsert the same data minus the cursor code in the memory. The J4 pulse requests the continuance of the R sequence with the R4 timing pulse. The R4 timing pulse and the succeeding R pulses are identical to the sequence described above. The J1 pulse is in addition also applied through an OR circuit 83 to reset the jump key sync latch 70.

The R6 pulse is fed back to clock 18 and requests another R1 pulse and the subsequent address in the buffer 22 is read into the output register 36. Upon the occurrence of the next SM code, the output of AND circuit 71 as previously described is utilized to reset the jump inhibit latch 81, thus conditioning one of the inputs of an AND circuit 84. The jump latch 80 conditions the second input of AND circuit 84 and the character mode and unprotected field latches 73*a* and 73*d* condition the other two inputs of AND circuit 84. Therefore, no further action other than regeneration under the R cycle as described above can occur until an SM code follows the depression of the jump key 67. In addition the character mode and unprotected field latches must be set to condition all of the inputs of AND circuit 84. When all of the inputs of AND circuits 84 are properly conditioned, an R4 pulse on a subsequent regeneration cycle of the memory will cause an AND gate 85 which is conditioned by AND gate 84 to initiate a K sequence.

The output of AND circuit 72 is applied through an inverter 86 to an AND gate 87 and upon the occurrence of an R3 pulse, provides an output from AND circuit 87 which via an OR circuit 88 requests continuance of the R sequence. A second input to OR gate 88 requesting continuance of the R sequence is derived from the output of an AND circuit 91 which is conditioned by the 0 output of the keyboard data latch which indicates that a keyboard entry is not desired at the occurrence of the R3 pulse. Thus, the two inputs to OR circuit 88 cover those conditions in which either a keyboard entry is not called for or the situation in which the jump key has not been actuated. Likewise, the output of AND gate 84 is connected via an inverter 89 to an AND circuit 90 and thence to clock 18 to request continuance of the R sequence with R5 when the jump key sync latch has been previously set but unprotected character mode has not been detected following an SM code.

The K1 timing pulse is applied to OR circuit 32 and causes a read cycle via the code read/write control 33. The K2 pulse is applied through OR circuit 48 to set the cursor bit to "one" and pulse K3 via OR circuit 41 and read/write control circuit 33 inserts the contents of register 36 in the buffer 22. The K4 pulse which follows the K3 pulse causes the R sequence to be continued from R5. At this point, the contents of register 36 are applied to the CRT 59 via AND gate 55, display data flow registers 56, XY deflection registers 58 and XY deflection circuits 57. The R6 pulse which follows steps the address register counter 28 to the next address and resumes the R sequence as described above.

At the time that the K sequence is initiated by the output of AND circuit 85, the output of the AND circuit 85 is applied through a delay circuit 92 to an AND gate 93 which is enabled by an inverter 94 connected to a negative power supply. The output of AND circuit 93 when the output of inverter 94 is effective is applied to a driver circuit 95 for releasing the jump key by energizing a restore solenoid 96. This releases the jump key and causes the cursor jump operation to be terminated.

If the operator wishes a continuous jumping operation in order to skip over one or more fields of unprotected character data, he may press a continuous key 97 on the keyboard. This closes contacts 98 which disables AND circuit 93 via inverter 94, thus preventing restoration of the jump key. The jump key will not be restored and the cursor will jump from field to field until the continuous key is released. As soon as the continuous key is released, the cursor will be positioned in the first data position following the next unprotected character field as described above. The output of the mode latches 73 (*a*, *b*, *c* and *d*) are returned to the clock 18 for interpretation of the various signals that are fed back. Thus, the mode latches outputs will in conjunction with the outputs of AND circuit 79 and 85, for example, initiate the various sequences only when the data being processed is of the proper mode, thus a K sequence can only be initiated in a character mode which is unprotected. Likewise, J sequence can only be initiated in a character mode. The clock may take many forms and one arrangement is shown in FIG. 3 which will be described later.

Thus far, the two set buffer address register commands, the insert cursor command, the remove cursor command and the write buffer command have been described. The final command, the read cursor command, will be sent over the interface by the processor at the termination of an editing or composing operation by the operator at the keyboard. As previously set forth, the processor may enter data information in the core buffer 22 which requires an answer by the operator. After the data is entered, the processor inserts the cursor in a particular address in the core buffer which will cause the cursor to be displayed in a position on the screen where the operator is to provide an answer. The operator will enter the answer via the keyboard, advancing the cursor one position at a time as previously described. When the answer to the question is completed, the operator will normally signal the processor by depressing a key on the keyboard 60, indicating an end of message. The computer will normally return with a set buffer address register command and stop. The command will specify the address at which the cursor had originally been entered and this command would then be followed by the read cursor command.

The read cursor command causes the buffer to be read one address at a time and the data stored in the buffer in those addresses transmitted back to the processor. At the completion of the answer the processor will cause regeneration of the display or some other function to be performed.

The read cursor command is provided by the processor over the interface and decoded in command decoder 16. The decoded command is applied to clock 18 and causes in sequence, pulses E1 through E4 to be repeated. When the cursor bit is detected, an E5 pulse is generated which terminates the read command and signals the processor that the cursor has been detected and that the answer to a previously inserted question has been completed. The E1 pulse is applied through OR circuit 32 to the control circuit 33 and causes the address contained in address register 28 which was previously inserted by a set buffer address register and stop command to be read into the output register 36. The E2 pulse which follows causes the data in register 36 to be regenerated and restored in the buffer 22. This pulse is applied to OR circuit 41 and thence to the write control circuit 33 for effecting the writing back of the data into the memory. The E3 pulse is utilized to condition a pair of AND gates 99 and 100. Gate 99 is connected to the 0 output of the cursor bit position of register 36. If the cursor is not present, the gate 99 provides an output which is applied to a gate 102 and causes the transfer of the data in register 36 via gate 102 and OR circuit 103 to the bus in 14 whereupon it is transferred via the interface back to the processor. The E4 pulse which would follow if this were the case is applied to OR circuit 43 and steps the address counter 28 causing the next location in the buffer 22 to be read. This sequence is repeated until the cursor bit is detected.

The detection of the cursor bit causes the E series to go to an E5 and terminate. For this purpose, the output of AND circuit 99 is applied to set a latch 105 which has its one output connected to enable one input of an AND circuit 106. The E4 pulse is applied to the other input of AND circuit 106 which, if previously enabled, will request the E1 series or sequence to be repeated. The E4 pulse is passed through a delay circuit 107 and resets latch 105. Thus, at the occurrence of each E3 pulse, if the cursor bit is 0 indicating that the cursor is not present in the address being read, the latch 105 will be set which will enable gate 106 and upon the occurrence of the E4 pulse, the E1 pulse will be requested from the clock. If the cursor bit is not a 0, AND gate 99 will not develop an output and the latch will not be set. Thus, the E1 sequence will not be started after the E4 pulse.

On a subsequent of the E pulses, assuming for the moment that the address previously read contained no cursor code, the E1, E2 cycles would be identical, that is the augmented address would be read from the buffer into the output register 36 and be restored into the buffer 22 on the E2 pulse. The E3 pulse finds gate 100 enabled because a cursor bit is in the C position. This indicates that the message is completed and a special code from an encoder 108 is transferred via an AND gate 109 which is conditioned by the output of AND circuit 100 and through OR circuit 103 to the interface and thence to the processor to indicate that the answer is complete. At the same time, the output of gate 100 is sent to clock 18 to request the E5 pulse following the E4 pulse. The E5 timing pulse is applied via OR circuit 30 to the interface to indicate that the command read cursor has been completed.

The output of OR circuit 30 at E5 indicates to the processor that the next command required by the program should be transmitted over the interface to the unit. The next command will, of course, be selected by the processor program which, in most instances, will be a regeneration command or it may be a write buffer command. In either case, the command would be preceeded by a set buffer address register and start command or a set buffer address register and stop command.

If the operation is a series of questions and answers, the next command would be a set buffer address register and stop command followed by a write buffer command in which the subsequent question would be entered into the buffer and this would again be followed by the same sequence described above. The program may call for any number of sequences and in any order. The particular sequences or the order in which the sequences are utilized will depend upon the type of data being displayed and the use to which the display is to be put. However, each of the operations and the order will utilize the same circuits hereinabove described.

FIG. 3 shows in schematic form part of the clock 18. It is believed that the extent of the showing is sufficient for indicating to those skilled in the art how such a clock may be constructed since four of the sequences previously described are shown implemented. Throughout the figure certain components previously described in FIG. 2 are repeated in order to simplify the explanation of the clock. These components include AND gates 52, 72, 79, 87, 63, 91, 84, 85 and 90, in addition OR gate 88, inverters 86 and 89 and oscillator 20. These bear the same reference numerals and provide the outputs previously described.

The clock is made up of a plurality of triggers. Each sequence, such as the R sequence, is provided with a trigger associated with each of the pulses previously described. Thus, the R sequence includes six triggers labeled R1 through R6 inclusive. The L sequence includes eight triggers labeled L1 through L8 inclusive. The J sequence has four triggers labeled J1 through J4 and the K sequence four triggers labeled K1 through K4. The "one" output of each trigger is connected to an AND gate and enables that AND gate if the associated trigger is set. The oscillator 20 is connected to each of the AND gates connected to the one output of the various triggers and strobes these gates, passing a pulse if the gate is enabled. The output developed at the enabled gate provides the pulse corresponding to the label on the set trigger. This output is fed back through a delay circuit to reset the set trigger and to set the next trigger in the sequence. Where the sequence may be interrupted such as at R3 and R4 the setting of the next trigger is dependent upon the conditions previously described.

The output of AND gate 52, which as previously stated, occurs at the A3 pulse in the A sequence only when the command previously received was a set buffer address register and start command, is applied to an OR circuit 110 and sets the R1 trigger to the one state. Upon the occurrence of the next succeeding pulse from oscillator 20 the output of the AND gate connected to the one output of trigger R1 is passed via the delay circuit to reset the R1 trigged and set the R2 trigger. At the same time a pulse is developed on the line labeled R1. This is the same R1 pulse which was previously described above in connection with the description of FIG. 2. The subsequent pulse from oscillator 20 is passed via the AND gate connected to the one output of the R2 trigger to provide the R2 pulse and through the connected delay circuit to reset the R2 trigger and set the R3 trigger. This places the R3 trigger in the same condition as previously described for triggers R1 and R2. Upon the subsequent pulse form oscillator 20 the R3 output is developed. This is applied to AND gates 91, 63 and 79 and 87 as previously described in FIG. 2. The inputs for the gates 91, 63 and 72 are shown with legends thereon. If the keyboards data latch 62 is not set AND gate 91 passes a pulse through OR circuit 88 previously described and an OR circuit 111 to the set input of the R4 trigger to continue the R sequence following the R3 pulse. The R4 trigger responds to an oscillator 20 pulse via the connected AND gate to provide the R4 pulse. This is fed back through the associated delay circuit to reset the R4 trigger. The output of the associated delay circuit is applied to AND gate 85 and 90 as previously described. Here again the various conditions must be met because branching may take place in the sequence at this point. If the jump inhibit latch 81 is not clear, that is, it is a "one," or the jump latch 80 is not set, or the mode decoder 53 has not previously set the character mode latch 73a and the unprotected field latch 73c, the output of AND gate 84 will be down. This will be inverted in an inverter 89 and passed through AND gate 90 upon the occurrence of the R4 trigger. The output of AND gate 90 is passed through an OR circuit 112 and continues the R sequence with R5 since the output of OR circuit 112 is applied to the set input of the R5 trigger to set the R5 trigger to one. The succeeding pulses from oscillator 20 are rippled down through R6 at which point the output of the R6 pulse is fed back through OR circuit 110 to set the R1 trigger.

This sequence will continue until interrupted by either the keyboard data latch 62 becoming set along with a one in the C position of the output register 36. If the keyboard data latch 62 has been set and a one is found in the C position of the output register 36 AND gate 63 passes the R3 pulse to the set input of the L1 trigger and starts the L sequence of pulses. The L sequence continues uninterrupted once started from L1 to L8. The L8 pulse is applied through OR circuit 111 to resume the R sequence at R4. The R5 and R6 pulses follow and R6 is as previously described fed back to restart the R sequence.

Upon the next occurrence of the R3 pulse it may find AND gate 72 enabled, if the jump key sync latch 70 has been set, if the character mode latch 73a has been set, and if the C bit of output register 36 is a one. In this event AND gate 79 is enabled and the output of AND gate 79 is fed to the J1 trigger to set the J1 trigger to a "one" and institute the J sequence. The J4 pulse is fed through OR circuit 111 to resume the R sequence with R4. Here again R5 and R6 follow and another R sequence ensues when the output of the R6 trigger is fed back through OR gate 110 to set the R1 trigger.

The K sequence is instituted when the R4 pulse finds AND gate 84 properly conditioned by the jump inhibit latch 81 being clear, that is set at zero, the jump latch 80 being set at "one," character modes, and unprotected field latch set as previously described. Here the R4 pulse as applied via AND gate 85, which is conditioned by AND gate 84, to set the K1 trigger and institute the K sequence. The K4 pulse is fed back via OR circuit 112 to the "one" input of the R5 trigger to resume the R sequence at R5.

While the invention has been particularly shown and described with reference to a singe preferred embodiment thereof, it will be understood by those skilled in the art that various changes in form and detail may be made therein without departing from the spirit and scope of the invention.

What is claimed is:

1. In a display system provided with a plural field storage device and a display responsive thereto for creating visual images corresponding to the stored data, the combination comprising, means responsive to a first signal condition for inserting coded data representing variable information in selected ones of said field in said storage device, means responsive to a second signal condition for inserting a cursor code in a selected storage location within a field in said storage device, means responsive to a third signal condition for causing cyclic transmission of said stored data to the display to thereby regenerate the visual image represented by the stored data, means responsive to detection of the cursor code in said storage device for editing the stored data in the location occupied by said cursor code and advancing the storage location of said cursor code, and storage readout addressing means including means for receiving an address corresponding to an original cursor location at the beginning of the editing operation, said readout addressing means further including means responsive to a fourth signal condition for reading said edited data from said storage device progressively from the original cursor location, and detector means active during said reading of edited data and responsive to the encountering of said cursor code in said storage device to terminate said reading at the current cursor storage location.

2. A display system as set forth in claim 1 in which said means responsive to the said detection of cursor code includes a manually operable keyboard for inserting coded alphanumeric data in the storage location occupied by the cursor code.

3. A display system as set forth in claim 2 in which said storage device includes a plurality of word storage locations each of which has a predetermined number of binary storage areas for data and at least one additional binary storage area for the cursor code.

4. A display system comprising, a plural field storage means, a data source for supplying image and command data, a command decoder responsive to said data source for decoding commands and supplying control signals corresponding thereto, first means responsive to a first control signal for inserting image data from the source in selected ones of said fields in the storage means, second means responsive to a second control signal for inserting a unique code in a selected location within a field in the storage means, a display means including a display element for creating visual images corresponding to data supplied thereto, third means responsive to a third control signal for cyclically applying the stored data in the storage means to the display means, fourth means responsive to detection of the unique code in the storage means for entering data in the location in storage in which the unique code resides and including means for changing the location of the unique code in the storage means, and storage readout addressing means including means for receiving an address corresponding to an original unique code location at the beginning of the editing operation, said readout addressing means further including means responsive to a fourth control signal for non-destructively reading the data in the storage means progressively from the original storage location of the unique code, and detector means active during said reading of data and responsive to the encountering of said unique code in said storage means to terminate said reading at the current storage location of the unique code.

5. A display system as set forth in claim 4 in which said fourth means includes a manually operable keyboard for inserting coded alphanumeric data in the storage location occupied by the unique code.

6. A display system as set forth in claim 5 in which said storage means includes a plurality of word storage locations each of which has a predetermined number of binary storage areas for data and at least one additional binary storage area for the unique code.

References Cited

UNITED STATES PATENTS

| | | | |
|---|---|---|---|
| 3,166,636 | 1/1965 | Rutland | 340—324.1 |
| 3,346,853 | 10/1967 | Koster et al. | 340—172.5 |
| 3,364,473 | 1/1968 | Reitz et al. | 340—324 |

THOMAS B. HABECKER, Primary Examiner

M. M. CURTIS, Assistant Examiner

U.S. Cl. X.R.

178—17.5